(No Model.) 2 Sheets—Sheet 1.
W. F. BLAKEMORE.
DEVICE FOR TIGHTENING ROPES.
No. 404,158. Patented May 28, 1889.
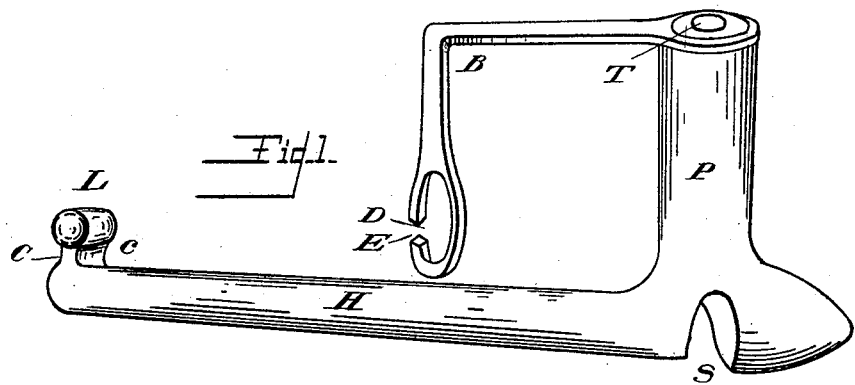
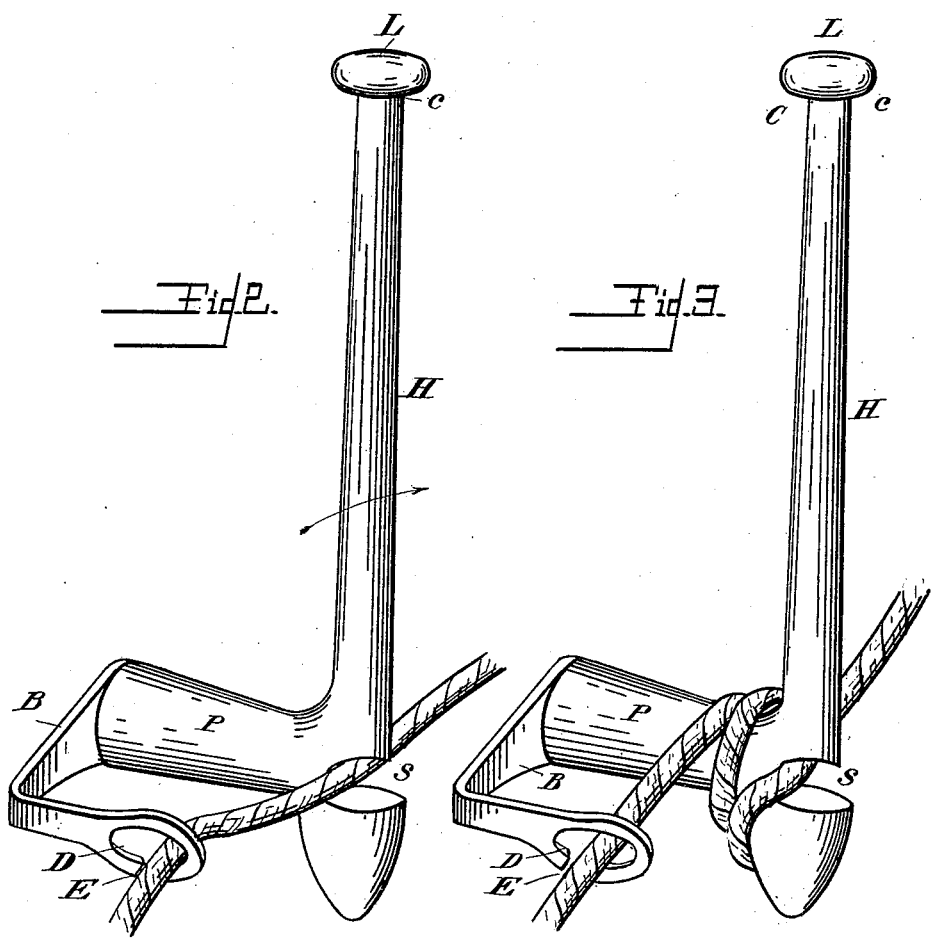
Witnesses.
C. S. Champion.
J. H. Sutherland.
Inventor,
Wm. F. Blakemore
E. B. Stocking
Attorney.

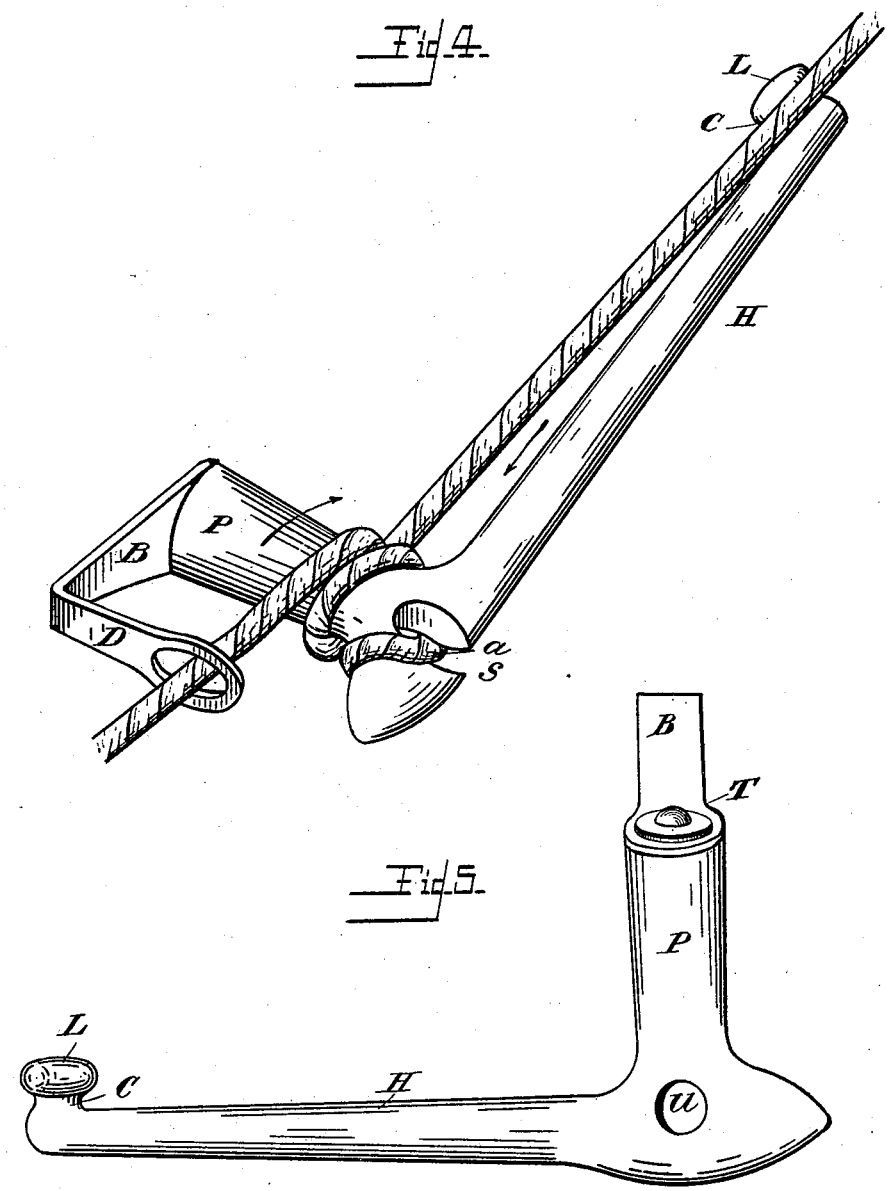

UNITED STATES PATENT OFFICE.

WILLIAM F. BLAKEMORE, OF DAVENPORT, IOWA.

DEVICE FOR TIGHTENING ROPES.

SPECIFICATION forming part of Letters Patent No. 404,158, dated May 28, 1889.

Application filed October 17, 1888. Serial No. 288,366. (No model.)

*To all whom it may concern:*

Be it known that I, WILLIAM F. BLAKEMORE, of the city of Davenport, in the county of Scott and State of Iowa, have invented a new and useful Improvement in Devices for Tightening Ropes or Cordage, of which the following is a specification.

The object of the invention is to produce a simple and efficient device for tightening ropes that from any cause are loosened or sagged, so constructed that it may be applied at any desired point on the rope and be manipulated to take up the slack and maintain the said rope in the stretched condition.

In the drawings, Figure 1 is a perspective view of the device in the preferred form. Figs. 2, 3, and 4 are perspective views of the device, showing it applied to a rope to illustrate the operation. Fig. 5 is a perspective view of a modified form of the device. Fig. 6 is a detail view of the locking-lug.

The implement, tool, or device consists of a suitable bar or handle, H, having a lug, C, projecting from one side near one end. Near the other end of the handle, and from the same side as the lug C, projects an arm, P, preferably cylindrical and increasing in diameter toward its free end. The handle H extends on both sides of the said arm, the longer portion carrying the said lug C. The handle is provided with an aperture or passage or formed with a recess, S, opposite the arm P for the reception of the rope, as will presently appear, and the lug C has an enlarged head, L, for locking the device on the rope. Attached to the free end of the arm P by a swivel-connection, T, is a bracket, B, parallel with the bar H for a short distance and then turned sharply toward the said bar at about right angles thereto and terminating in a loop, D, having an opening, E, through one side.

The operation of the device above described, and illustrated in Figs. 1 to 4, is as follows: The tool is placed on the rope with the latter in the recess S and open loop D and the arm P on the side of the rope opposite the operator. The handle H is by preference placed upright and the tool is pulled toward the operator until that portion of rope in the recess S is carried beyond the main portion and assumes the position shown in Fig. 2. The handle is then moved in either direction; but in the figures it is shown as though moved to the right, which movement is indicated by the arrows. The said movement being continued, the rope on each side of the recess will be carried one portion below and the other portion above the arm P, forming the loop a, Fig. 3, when the further movement of the handle will cause the rope to be wound in opposite directions, and from both sides, on the arm P, which thus becomes the axis of the tool. When the desired tension is obtained, the lug C is passed under the rope, so that the latter rests between the handle H and the head L, as shown in Fig. 4, and thus locks the tool against reverse rotation.

During the above-described operation the bracket B does not turn with the handle, but serves only to facilitate the placing of the device on the rope and the formation of the loop a, and merely rests idly on the said rope after it begins to wind on the arm P.

In Fig. 5 I have shown the recess S replaced by a hole or aperture, U, so that the rope must be unfastened at one end, passed through the hole U, and then again secured, after which the operation of the tool is the same as in the other forms, except that it cannot be removed without first removing the rope from one of its supports.

As it is evident that the form of the device may be variously modified without departing from the spirit of the invention, I do not confine myself to the exact construction shown.

Having described the invention, what I claim is—

A rope-tightening device or tool consisting of the bar or handle H, having the aperture in one side and near its end, the arm P, formed opposite the said aperture, the bracket B, pivoted to the arm and formed with the open loop D, and the locking-lug C near the other end of the bar or handle H, substantially as specified.

WILLIAM F. BLAKEMORE.

Witnesses:
JOHN R. BLAKEMORE,
W. A. BEMIS.